(12) United States Patent
Pulapaka et al.

(10) Patent No.: US 9,208,313 B2
(45) Date of Patent: Dec. 8, 2015

(54) PROTECTING ANTI-MALWARE PROCESSES

(71) Applicant: Microsoft Corporation, Redmond, WA (US)

(72) Inventors: Hari Pulapaka, Redmond, WA (US); Nicholas S. Judge, Bellevue, WA (US); Arun U. Kishan, Bellevue, WA (US); James A. Schwartz, Jr., Seattle, WA (US); Kinshumann Kinshumann, Redmond, WA (US); David J. Linsley, Seattle, WA (US); Niraj V. Majmudar, Renton, WA (US); Scott D. Anderson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 90 days.

(21) Appl. No.: 13/915,590

(22) Filed: Jun. 11, 2013

(65) Prior Publication Data
US 2014/0359775 A1    Dec. 4, 2014

Related U.S. Application Data

(63) Continuation of application No. 13/907,331, filed on May 31, 2013.

(51) Int. Cl.
*G06F 21/56* (2013.01)
*G06F 21/51* (2013.01)
*G06F 21/57* (2013.01)

(52) U.S. Cl.
CPC ............ *G06F 21/56* (2013.01); *G06F 21/51* (2013.01); *G06F 21/575* (2013.01); *G06F 2221/2105* (2013.01)

(58) Field of Classification Search
CPC .................. H04L 63/145; G06F 21/56
USPC .......................................... 726/24
See application file for complete search history.

(56) References Cited

U.S. PATENT DOCUMENTS

| | | | |
|---|---|---|---|
| 6,286,013 | B1 | 9/2001 | Reynolds et al. |
| 6,738,810 | B1 | 5/2004 | Kramer et al. |
| 7,284,124 | B1 | 10/2007 | Ginsberg |
| 7,640,583 | B1 | 12/2009 | Marinescu et al. |
| 7,945,956 | B2 | 5/2011 | Mody et al. |
| 7,958,512 | B2 | 6/2011 | Lupu et al. |
| 8,185,749 | B2 | 5/2012 | Ciet et al. |

(Continued)

OTHER PUBLICATIONS

Microsoft (Early Launch Antimalware, Mar. 9, 2012, 10 pages).*

(Continued)

*Primary Examiner* — Saleh Najjar
*Assistant Examiner* — Oleg Korsak
(74) *Attorney, Agent, or Firm* — John Jardine; Judy Kadoura; Micky Minhas (57) ABSTRACT

Anti-malware process protection techniques are described. In one or more implementations, an anti-malware driver is signed using a hash that identifies a manufacturer of the anti-malware driver. The anti-malware driver is then provided to a computing device. The anti-malware driver may be assigned a protection level based on an agreement between the anti-malware manufacturer and an operating system manufacturer, and this protection level effects the operation of the anti-malware program on the computing device.

20 Claims, 9 Drawing Sheets

(56) References Cited

U.S. PATENT DOCUMENTS

| | | | |
|---|---|---|---|
| 8,201,244 | B2 | 6/2012 | Sun et al. |
| 8,549,644 | B2 | 10/2013 | Sallam |
| 8,635,705 | B2 | 1/2014 | Sahita et al. |
| 2004/0268135 | A1 | 12/2004 | Zimmer et al. |
| 2006/0242406 | A1 | 10/2006 | Barde et al. |
| 2007/0094496 | A1 | 4/2007 | Burtscher |
| 2008/0320594 | A1 | 12/2008 | Jiang |
| 2009/0089779 | A1 | 4/2009 | Brengle et al. |
| 2009/0198618 | A1 | 8/2009 | Chan et al. |
| 2011/0307711 | A1 | 12/2011 | Novak et al. |
| 2014/0013434 | A1 | 1/2014 | Ranum et al. |
| 2014/0025939 | A1* | 1/2014 | Smith et al. ................ 713/2 |
| 2014/0359774 | A1 | 12/2014 | Pulapaka et al. |

OTHER PUBLICATIONS

Microsoft (Trusted Boot: Hardening Early Boot Components Against Malware, Sep. 13, 2011, 10 pages).*

"CWE-732: Incorrect Permission Assignment for Critical Resource", Retrieved from <http://cwe.mitre.org/data/definitions/732.html> on Mar. 26, 2013, (Sep. 8, 2008), 6 pages.

"Description of the Windows File Protection Feature", Retrieved from <http://support.microsoft.com/kb/222193> on Mar. 26, 213, (Sep. 11, 2009), 3 pages.

"Protected Processes", *Microsoft Corporation*, Retrieved from <http://download.microsoft.com/download/a/f/7/af7777e5-7dcd-4800-8a0a-b18336565f5b/process_Vista.doc>,(Nov. 27, 2006), 5 pages.

Andrew, Ben "Access Protection in McAfee VirusScan Enterprise and Host Intrustion Prevention", *White Paper of McAfee*, Available at <https://kc.mcafee.com/resources/site/MCAFEE/content/live/PRODUCT_DOCUMENTATION/20000/PD20870/en_US/5345wp_tops_vse_ap_0109s.pdf<,(Jan. 2009), 24 pages.

"Early Launch Antimalware", Available at: <http://www.google.co.in/url?sa=t&rct=j&q=&esrc=s&frm=1&source=web&cd=6&cad=rja&uact=8&ved=0CEoQFjAF&url=http%3A%2F%2Fdownload.microsoft.com%2Fdownload%2F1%2FB%2F5%2F1B57097B-B06B-40D8-820C-EA3221E25E9E%2Fearly-launch-anti-malware.docx&ei=Z58, Microsoft,Mar. 9, 2012, 10 Pages.

"Windows 8—Addressing the Security Challenges of Today and Tomorrow", In Proceeding: Information Week, May 20, 2013, 1 Page.

"Windows 8 Security Improvements", Retrieved From: <http://technet.microsoft.com/en-us/windows/jj983723.aspx> on Mar. 11, 2014, Feb. 16, 2013, 3 Pages.

Ash, et al., "Security Features in Windows CE .NET", Retrieved From: <http://msdn.microsoft.com/en-us/library/ms836811.aspx> on Mar. 11, 2014, Jan. 2003, 44 Pages.

Ionescu, "Alex Ionescu's Blog", Retrieved From: <http://www.alex-ionescu.com/?feed=atom> on Mar. 11, 2014, Jan. 19, 2014, 36 Pages.

Shackleford, "McAfee Total Protection for Server Review", In Proceedings: SANS Whitepaper, Jun. 2010, 22 Pages.

"International Search Report and Written Opinion", Application No. PCT/US2013/061054, Nov. 22, 2013, 12 pages.

Cobb, "Utilize Windows 8 ELAM to Secure the Boot Process, Detect Rootkits", Available at: http://searchsecurity.techtarget.com/answer/Utilize-Windows-8-ELAM-to-secure-the-boot-process-detect-rootkits, Mar. 15, 2013, 1 page.

"Non-Final Office Action", U.S. Appl. No. 13/907,331, Mar. 26, 2015, 16 pages.

"Final Office Action Issued in U.S. Appl. No. 13/907,331", Mailed Date: Sep. 11, 2015, 15 pages.

\* cited by examiner

PROTECTING ANTI-MALWARE PROCESSES

RELATED APPLICATIONS

This continuation application claims priority to U.S. application Ser. No. 13/907,331 filed May 31, 2013, entitled "Protecting Anti-Malware Processes" to Pulapaka et al., the disclosure of which is incorporated by reference herein in its entirety.

BACKGROUND

Computing devices have increasingly become repositories for sensitive data of corporations and users. This has given rise to malicious users who try to gain access to these computing devices. Additionally, malicious users often attempt to install programs that track user interactions or utilize the computing resources of computing devices for malicious purposes.

Consequently, anti-malware software has been developed to block these malicious users from gaining access to computing devices. However, malicious users continually attempt to circumvent the protection that anti-malware software provides. These malicious users may attempt to operate as the anti-malware software, also known as "spoofing" the anti-malware software, terminate the anti-malware software, and so on. One way malicious programs gain access to anti-malware software is by posing as an administrative user. Since administrative users have broad permissions to terminate or otherwise alter processes, malicious users posing as an administrative user may open a computing device to attack by disabling the protection provided by the anti-malware software.

SUMMARY

Techniques for protecting anti-malware processes are described. In one or more implementations, an anti-malware process associated with an anti-malware driver is verified based at least in part on certificates contained in an anti-malware driver. The certificates are registered with an operating system for future use.

In one or more implementations, a computing device comprises one or more processors and one or more modules implemented at least partially in hardware. The one or more modules are configured to launch an anti-malware process. The one or more modules also assign the anti-malware process to a protection level defined by a signer and a protection type based at least in part on certificates contained in an anti-malware driver. The one or more modules may also execute the anti-malware process on the computing device.

In one or more implementations, one or more computer-readable storage media comprise instructions stored thereon that, responsive to execution by the computing device, cause the computing device to execute an anti-malware process protection module. The anti-malware process protection module is configured to perform operations comprising verifying, during a boot process, an anti-malware driver associated with an anti-malware program based at least in part on certificates contained in the anti-malware driver, the certificates containing an identity that is signed with a trusted certificate from a verified source, registering the certificates with a kernel of an operating system, verifying an anti-malware process associated with the anti-malware program based at least in part on the registered certificates and without regard to a permission level associated with the user associated with the anti-malware process, assigning a protection level to the anti-malware process based at least in part on the registered certificates, and preventing the user from altering the anti-malware process, the altering including terminating the anti-malware process, injecting code, or loading binaries related to the anti-malware process.

In one or more implementations, an anti-malware driver is signed and then provided to a computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

As malicious users arose, a relationship developed between operating system manufacturers and anti-malware manufacturers to secure user's data. However, these techniques have to continually develop and advance in order to address the continued development of malicious techniques that are used to compromise this data. Conventional techniques for securing a computing environment against malicious users and malware programs, for example, may fail to protect the computing environment from attacks by users utilizing administrative permissions. Consequently, these malicious users may perform undesired activities within the computing environment, such as terminating a process.

Accordingly, techniques are described for verifying an anti-malware process and assigning the process a protection level based on a signature associated with an anti-malware driver. In this manner, the actual code being executed is checked, rather than the user permissions associated with a user that started the process. For example, it may be more difficult to "spoof" who signed a portion of code than to "spoof" a user.

To enable the anti-malware process to take advantage of these code checking operations, the operating system manufacturer and the anti-malware manufacturer may reach an agreement with each other concerning what is considered a "verified signature" for the anti-malware driver. The anti-malware manufacturer and the operating system manufacturer, for instance, may engage in a tightly controlled process in order to generate the verified signature, and therefore the verified signature cannot easily be "spoofed" or tampered with. Further, since the operating system manufacturer may use verified signatures to protect processes verified by the operating system through the hierarchy of protection levels, use of a verified signature to protect anti-malware processes gives anti-malware processes a level of protection commensurate with the protection given to the operating system itself.

Thus, the code checking process may protect the anti-malware process as the anti-malware process protects the computing environment from malicious users. In an example use scenario, an anti-malware process may be launched by an operating system that has a protection level reserved for anti-malware processes. The protection level may be included within a hierarchy of protection levels associated with other processes, or may be a reserved protection level that operates outside the hierarchy of protection levels for other processes. By assigning the anti-malware process to a protection level, the anti-malware process may operate without having to monitor whether other processes attempt to alter or tamper with the anti-malware process. Thus, computing resources that otherwise would be used by the anti-malware process to protect itself from attacks may be freed up and utilized by the computing device for other operations.

Further, the protections to the anti-malware process can be extended to prevent malicious administrative users from terminating or otherwise altering the anti-malware process. Alteration of the anti-malware process may include opening an invasive handle on the anti-malware process, injecting code into the anti-malware process, reading or writing to memory used by the anti-malware process, or otherwise accessing the anti-malware process.

Yet further, malicious administrative users may be of concern since administrative users typically have permission to perform operations that are vital to the function of the computing device, such as to enable backups, restore privileges, take ownership of processes, terminating processes, and launching processes from the core of the operating system. The techniques described herein may be used to prevent malicious administrative users from exercising these operations against an anti-malware process.

When granting the anti-malware process a protection level, the computing device may verify that the anti-malware process is associated with an anti-malware program. For example, an operating system of the computing device may verify the anti-malware process by loading a driver associated with the anti-malware program. This anti-malware driver may contain a signature. The operating system may also have received a verified signature from a trusted source. If the signature contained in the anti-malware driver and the verified signature from the trusted source match, the anti-malware process is verified as legitimate, and is granted the protection level reserved for anti-malware processes.

In the following discussion, an example environment is first described that may employ the anti-malware process protection techniques described herein. Example procedures are then described which may be performed in the example environment as well as other environments. Consequently, performance of the example procedures is not limited to the example environment and the example environment is not limited to performance of the example procedures.

Example Environment

Figure 1:
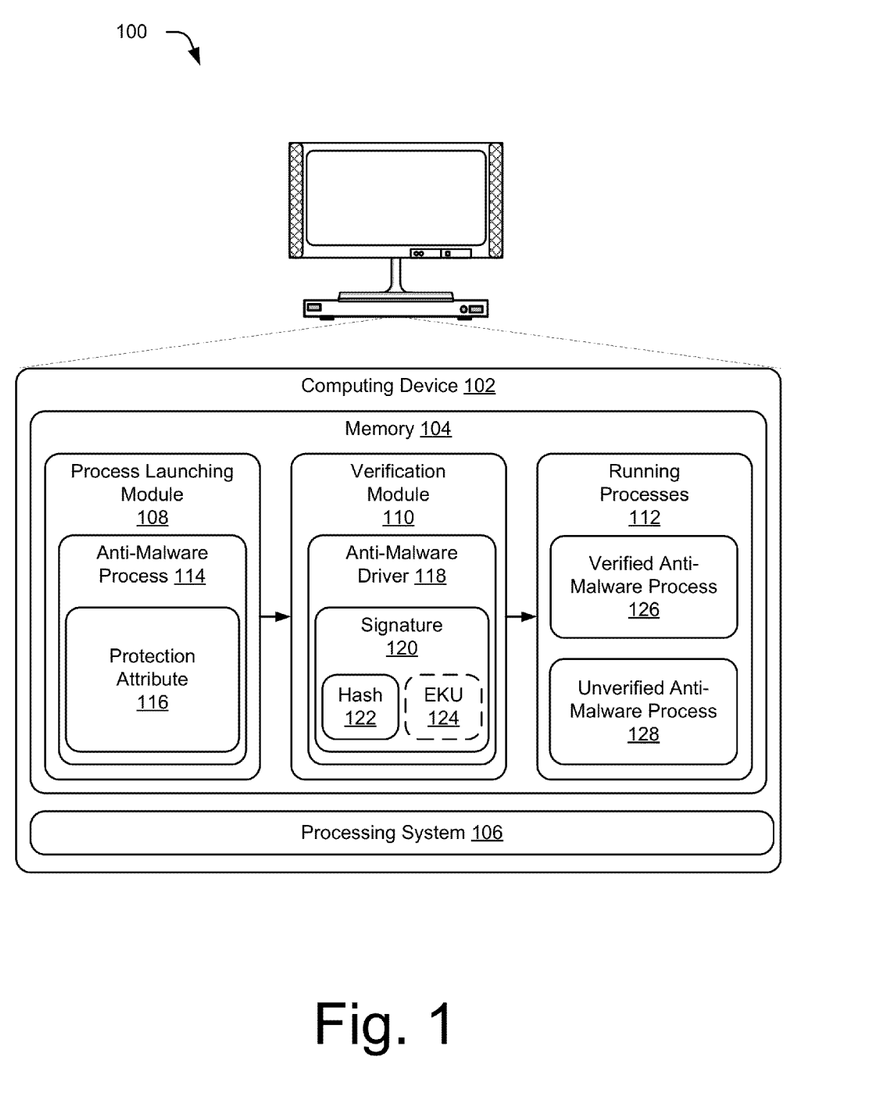
FIG. 1 is an illustration of an example computing device that is operable to implement the anti-malware process protection techniques described herein.

FIG. 1 is an illustration of an environment 100 in an example implementation that is operable to maintain the anti-malware process protection techniques described herein. The illustrated environment 100 includes a computing device 102 having a computer-readable storage medium that is illustrated as a memory 104 and a processing system 106 although other confirmations are also contemplated as further described below.

The computing device 102 may be configured in a variety of ways. For example, the computing device 102 may be configured as a computer that is capable of communicating over a network, such as a desktop computer, an entertainment appliance, a set-top box communicatively coupled to a display device, a game console, and so forth. The computing device 102 may also be configured as a mobile communications device, such as a laptop as illustrated, a tablet, a mobile phone, portable game device, portable music device, electronic notebook, and so on. Thus, the computing device 102 may range from full resource devices with substantial memory and processor resources (e.g., personal computers, game consoles) to a low-resource device with limited memory and/or processing resources (e.g., traditional set-top boxes, hand-held game consoles) as further described in relation to FIG. 7. Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 also includes an operating system. The operating system is configured to abstract underlying functionality of the computing device 102 to processes that are executable on the computing device 102. For example, the operating system may abstract the memory 104, the processing system 106, network, and/or display device functionality of the computing device 102 such that the applications may be written without knowing "how" this underlying functionality is implemented. A process, for instance, may provide data to the operating system to be rendered and displayed by the display device without understanding how this rendering may be performed. The operating system may also represent a variety of other functionality, such as to manage a file system and user interface that is navigable by a user of the computing device.

The memory 104 is illustrated as including a process launching module 108, a verification module 110, and running processes 112. The process launching module 108 is representative of functionality to launch processes for execution on the computing device 102, e.g., an anti-malware process 114. The anti-malware process 114 may have a protection attribute 116, which is the protection level requested by that the anti-malware process 114, further discussion of which may be found in relation to FIG. 2.

The anti-malware process 114 is then passed to the verification module 110, where the protection attribute 116 is utilized to obtain a protection level for the anti-malware process 114. For example, the verification module 110 may contain an anti-malware driver 118 that includes a signature 120 having a hash 122 and, optionally, one or more EKUs 124. The verification module 110 may utilize the signature 120, the hash 122 and/or EKU(s) 124 to verify that the anti-malware process 114 is eligible to receive the protection level associated with the protection attribute 116. If the anti-malware process 114 passes verification by the verification module 110, the anti-malware process 114 may be granted a protection level associated with the protection attribute 116. The anti-malware process 114 may then be added to the running processes 112.

Alternatively, if the anti-malware process 114 does not pass verification by the verification module 110, the anti-malware process may be allowed to run as an unverified anti-malware process 128, the anti-malware process 114 may be terminated, and so on. An unverified anti-malware process 128 does not have an associated protection level, and thus is not granted the protection level associated with the protection attribute 116. Therefore, the unverified anti-malware process 128 has limited access to the computing device and may be altered by one or more of the running processes 112. Consequently, an unverified anti-malware process 128 may be treated like an unprotected application, further discussion of which may also be found in relation to FIG. 2.

Thus, the environment 100 may leverage a tightly controlled agreement process between the operating system manufacturer and the anti-malware manufacturer to secure the environment 100. This process, specifically the generation of the anti-malware driver, is further described beginning in relation to FIG. 3.

Figure 2:
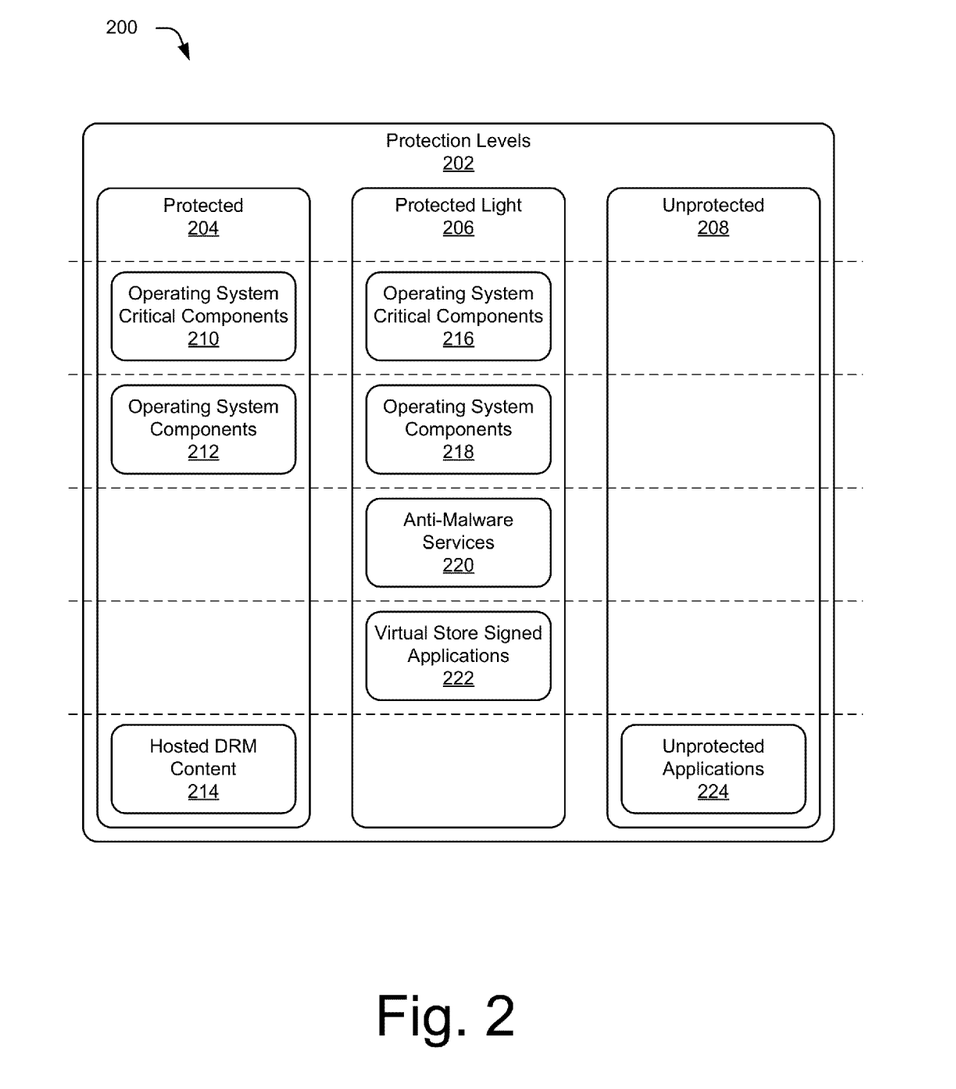
FIG. 2 illustrates a hierarchy of protection levels related to the anti-malware process protection techniques.

FIG. 2 illustrates a hierarchy 200 of protection levels 202 associated with the anti-malware process protection techniques. These protection levels are used to signify which processes may gain an invasive handle to which other processes. Generally, which will be described in more detail below, processes with a protection level 202 that is towards the left and top of the illustration may gain an invasive handle on processes with a protection level 202 towards the bottom and right of the illustration. Thus, both the "x" and "y" axis of the permission levels 202 have significance. Accordingly, the dashed lines in FIG. 2 signify the different protection levels 202, top to bottom, as further described below.

The hierarchy 200 defines protection types from highest to lowest in a left to right fashion, namely protected 204, protected light 206, and unprotected 208. Within a protection type, various signers are identified, and signers that have a higher protection level are located towards the top of the protection levels 202. The dashed lines in FIG. 2 indicate the different protection levels assigned to signers within the same protection type.

Within the protected 204 protection type of FIG. 2, three signers are identified, namely operating system critical components 210, operating system components 212, and hosted DRM content 214. Operating system critical components 210 are assigned the highest protection level on the computing device 102, and typically consist of the operating system kernel plus set of critical system processes.

Within the protected light 206 protection type, four signers are identified, namely operating system critical components 216, operating system components 218, anti-malware services 220, and virtual store signed applications 222. Within the unprotected 208 protection type, one signer is identified, namely unprotected applications 224.

Thus, each combination of protection type and signer is given a unique signing level. A variable may be created to store the signing levels, which may have a maximum size of 4 bits in one or more implementations. For example, the protection attribute 116 may be assigned a value associated with the variable, and the anti-malware process 114 may be verified by the verification module 110 and assigned a protection level 202 based on the information contained in the anti-malware driver 118, specifically the signature 120, hash 122, and EKU(s) 124.

Processes may be verified based on protection levels 202, rather than on the user privileges associated with a user attempting to launch a process. Thus, the anti-malware process 114, even if launched by an administrative user, may still be verified by the verification module 110 based on the protection attribute 116 and the information contained in the anti-malware driver 118. Similarly, the anti-malware process 114, even if launched by a user that has backup or restore privileges, may also be verified by the verification module 110.

Various processes may be given a protection level associated with a protection type and a signer. For example, the anti-malware process 114 may be given a protection level associated with protection type protected light 206 and signer anti-malware services 220, if the protection attribute 116 is associated with anti-malware services 220. In order for a first process to access a second process, the protection level 202 of the first process must be higher than the protection level 202 of the second process. A protection level 202 of a first process is higher than a protection level 202 of a second process when both the protection type and the signer of the first process are greater than or equal to a protection type and signer of the second process.

For example, a process signed by operating system critical components 210 with a protection level 202 of protected 204 may alter or otherwise access any process in the computing system 102. Further, a process signed by anti-malware services 220 with the protection level 202 of protected light 206 may alter or otherwise access processes signed by anti-malware services 220, processes signed by virtual store signed applications 222, or processes signed by unprotected applications 224. Similarly, a process signed by hosted DRM content 214 may be limited to alterations of or access to processes signed by hosted DRM content 214 or unprotected applications 224, even though hosted DRM content 214 has a higher protection type (e.g., protected 204) than a process signed by anti-malware services 220.

Alternatively, a process with a lower protection level may be granted limited access rights to a process with a higher protection level. For example, the process of the lower protection level may be granted the right to terminate a process with a higher protection level. However, the process with the lower protection level may not be granted these limited access rights when the process the higher protection level is signed with a particular protection level. For instance, operating system critical components 210, operating system critical components 216, and anti-malware services 220 may not allow a process with a lower protection level to have limited access rights, such as termination rights. Thus, termination of the verified anti-malware process 126 is limited to processes signed by operating system critical components 210, operating system critical components 216, and anti-malware services 220. This may be used to provide an added level of protection to the verified anti-malware process 126.

In accordance with the above described protection levels 202, there may be situations in which two processes may not be able to alter each other. For example, a process signed by hosted DRM content 214 cannot alter a process signed by anti-malware services 220, and a process signed by anti-malware services 220 cannot alter a process signed by hosted DRM content 214. Thus, processes signed by anti-malware services 220 or hosted DRM content 214 are isolated from each other in the protection levels 202, which provides greater security.

Alternatively, a protection level 202 may be defined that is not within the hierarchy of protection levels 202, which may be termed a reserved protection level. Processes signed with the reserved protection level may restrict access from processes signed with a higher protection level. For example, if virtual store signed applications 222 are assigned a protection level of "8" and the anti-malware services 220 are assigned a protection level of "7," typically processes signed by the anti-malware services 220 could not restrict access from processes signed by the virtual store signed applications 222. However, if the anti-malware services 220 were assigned a reserved protection level, processes signed by the anti-malware services 220, such as verified anti-malware process 126, could restrict access from processes signed by the virtual store signed applications 222.

Further, protection types may be determined based upon what type of signing method is required for the certificates extracted from a driver. For example, protection levels 202 of protection type protected 204 may require a page-hash signing method. Further, protection levels 202 of protection type protected light 206 may require a file-hash signing method. Thus, a more secure signing method may be required for a process to receive a higher protection type.

Additionally, processes may create child processes. A process that has received a protection level 202 may create an unprotected child process. The process that has received a protection level 202 may only pass handles to the unprotected child process explicitly via a passed-in handle list. The process that has received a protection level 202 may not pass all inheritable handles to an unprotected child process. Thus, a process that has received a protection level 202 may not create an unprotected child process that has a handle on a process with a protection level 202.

For example, if the verified anti-malware process 126 created a child process that was assigned a protection level of unprotected applications 224, the verified anti-malware process 126 is prevented from allowing the child process to have a handle on the verified anti-malware process 126, or any other process in running processes 112 that had a protection level 202 assigned to it.

Alternatively, if the verified anti-malware process 126 created a child process that was assigned a protection level of unprotected applications 224, the verified anti-malware process 126 may explicitly pass in individual handles to the child process. In the latter situation, the child process is given a handle on a process in running processes that had a protection level 202 assigned to it.

Figure 3:
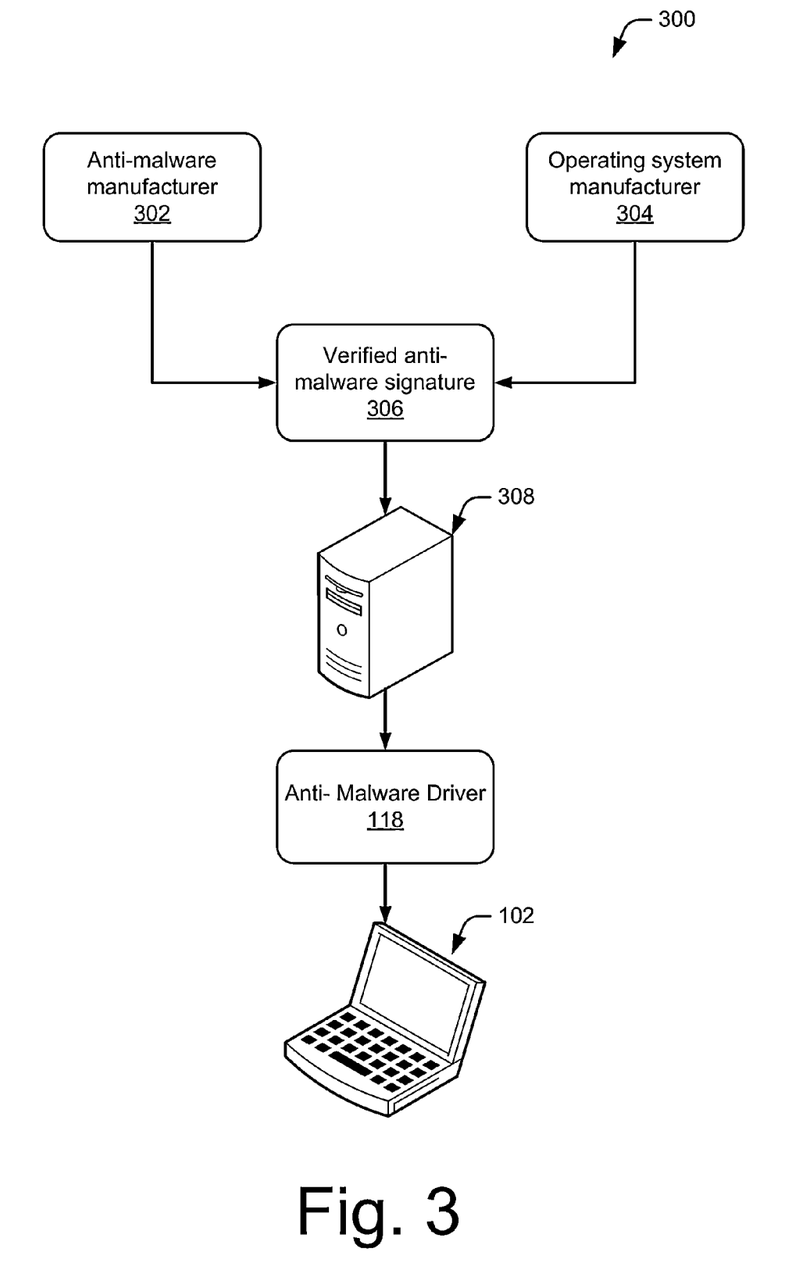
FIG. 3 depicts a system in an example implementation for signing an anti-malware driver.

FIG. 3 depicts a system 300 in an example implementation for signing an anti-malware driver. An anti-malware manufacturer 302 and an operating system manufacturer 304 communicate, and come to agreement to produce a verified anti-malware signature 306, such as the signature 120. The verified anti-malware signature 306 is sent to an anti-malware service 308. The anti-malware service 308 sends an anti-malware driver 118 to a computing device 102. The anti-malware driver 118 may be platform-independent, such that the anti-malware driver 118 it be utilized on a variety of different types of the computing devices 102.

Example Procedures

The following discussion describes anti-malware process protection techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environments 100 and 300 of FIGS. 1 and 3, and the protection levels 200 of FIG. 2, respectively.

Figure 4A:
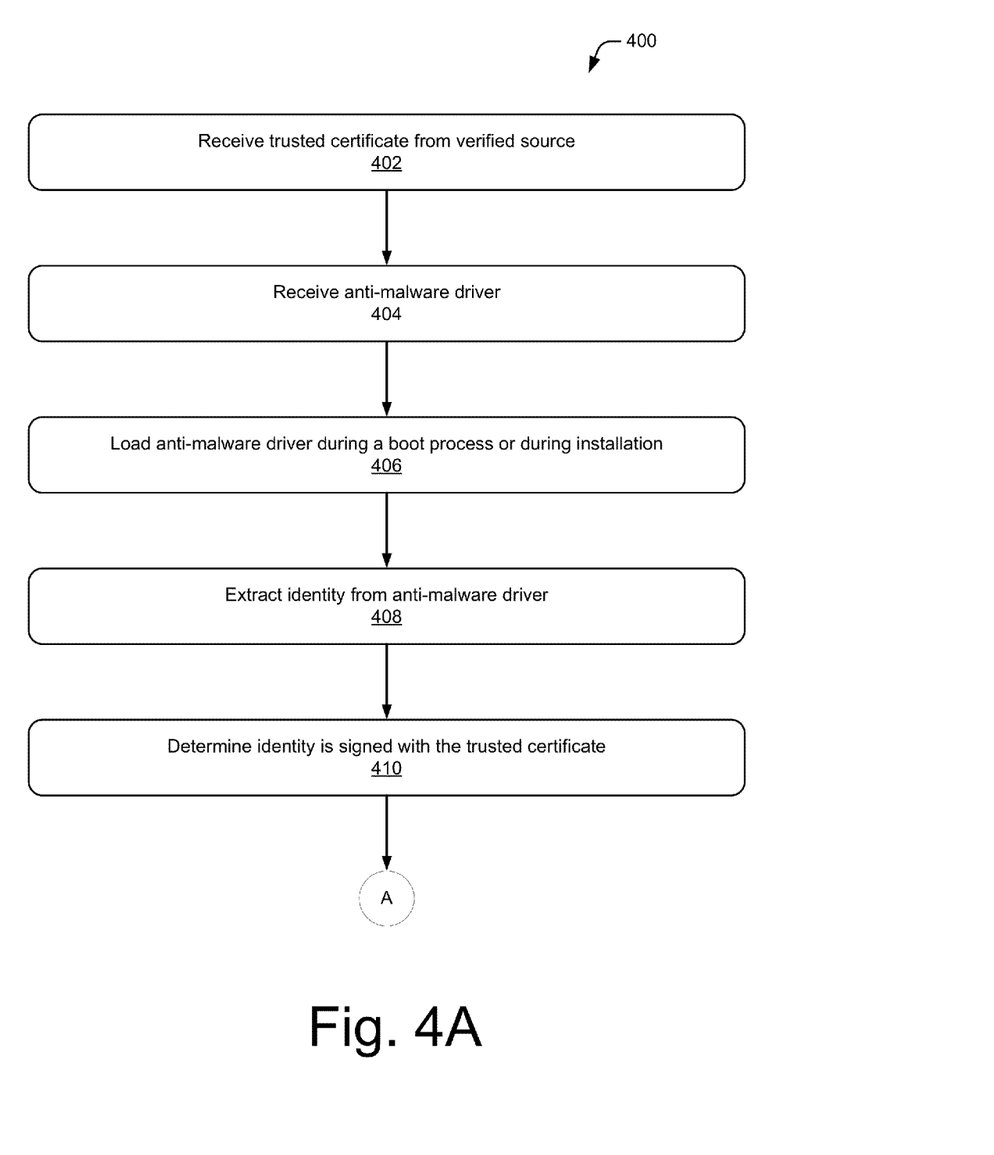
FIGS. 4A and 4B depict a procedure in an example implementation for protecting anti-malware processes.
Figure 4B:
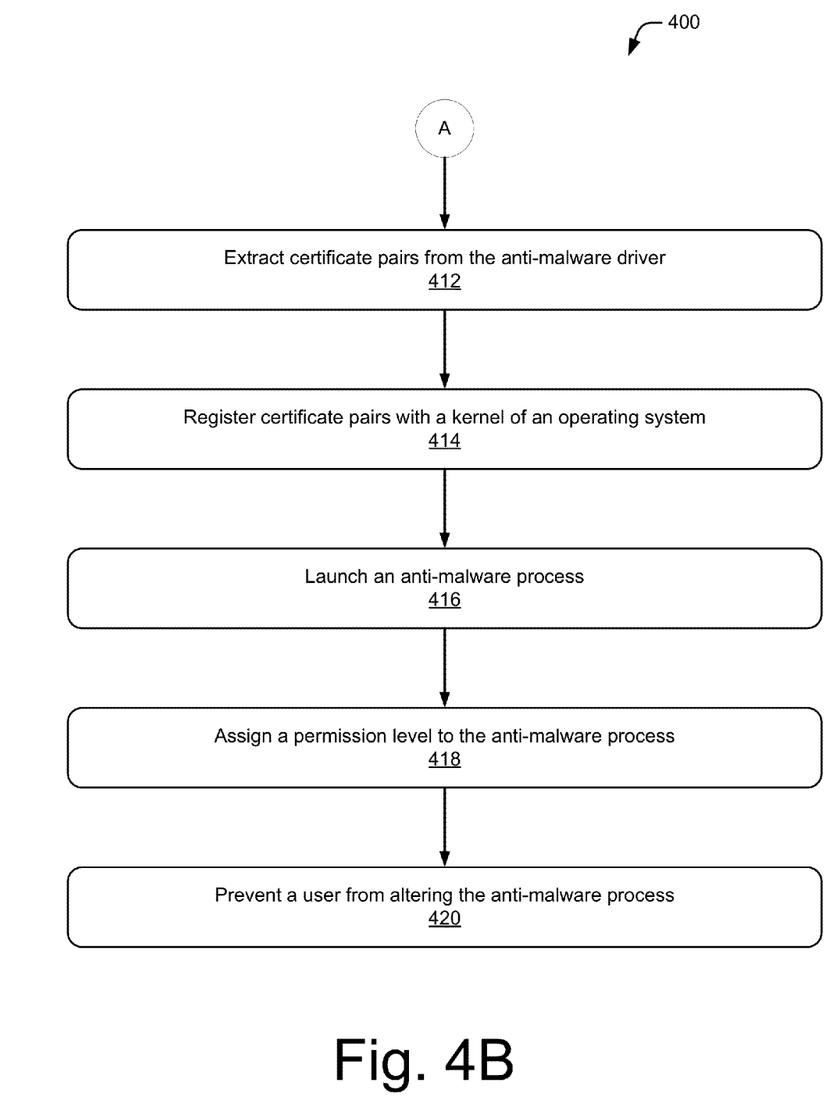

FIGS. 4A and 4B depict a procedure 400 for verifying that an anti-malware process may run at a specified protection level. For example, anti-malware process 114 that is seeking a protection level 202 associated with protection attribute 116 may be verified by verification module 110, which utilizes anti-malware driver 118.

A computing device receives a trusted certificate from a verified source (block 402). The trusted certificate may include an identity associated with the certificate, which indicates the verified source. The verified source may be, for example, an anti-malware manufacturer 302. Alternatively, the verified source may be, for example, the anti-malware driver 118. The anti-malware driver may be a verified source since the anti-malware driver 118 contains the verified anti-malware signature 306. The verified anti-malware signature 306 is trusted because it originates from the anti-malware manufacturer 302.

The computing device receives the anti-malware driver 118 (block 404). The anti-malware driver 118 may be sent from an originator of an anti-malware program, such as a manufacturer or vendor of an anti-malware program 302. Installation of the anti-malware driver 118 does not require a reboot of the computing device 102.

The computing device 102 loads the anti-malware driver 118 during a boot process (block 406). The anti-malware driver 118 may be reregistered during each boot process. An operating system manufacturer 304 may define a standard structure for the anti-malware driver 118, and this structure may be passed between the process launching module 108 and the verification module 110. Alternatively, the computing device 102 may load the anti-malware driver 118 during installation of an anti-malware program.

The computing device extracts an identity from the anti-malware driver (block 408). The identity may be associated with the anti-malware manufacturer 302. The identity may comprise a hash to further enhance security. The hash may have a minimum hash requirement which may be SHA256 by default.

The computing device 102 determines that the identity extracted from the anti-malware driver 118 is signed with the trusted certificate received from the verified source (block 410). This handshake ensures that the anti-malware driver 118 is legitimate.

The computing device extracts certificates from the anti-malware driver 118 (block 412). These certificates may be utilized to verify that an anti-malware process is legitimate, such that the anti-malware process is not the result of an attack by a malware program or malicious user. The certificates may designate an identity of an anti-malware manufacturer 302.

The computing device registers the extracted certificates with a kernel of an operating system (block 414). This provides additional protection for the certificates, as access to the kernel is limited. These certificates may be accessed from the kernel through application program interfaces (APIs). These APIs are not exported from the kernel.

The computing device 102 launches the anti-malware process 114 (block 416). The anti-malware process 114 may have an associated protection attribute 116, which designates a sought after protection level.

The computing device verifies that the anti-malware process 114 is legitimate, based on the certificates previously registered with the kernel of the operating system (block 418). The verification may not use a path. Not using a path prevents malicious code from swapping out a file beneath the call to verify the file and then extracting the certificates from the file. If the anti-malware process 114 is successfully verified, the verified anti-malware process 126 is assigned a protection level 202. Verification may not be successful if the protection attribute 116 seeks a protection level that is not included in the protection levels 202. The verification process is asynchronous so that other drivers cannot delay a load from completing via the verification process.

A user is prevented from altering the verified anti-malware process 126 (block 420). This includes preventing an administrative user from altering the verified anti-malware process 126. Specifically, in order to alter the verified anti-malware process 126, the process attempting to access the verified anti-malware process 126 must have a protection level 202 that is greater than or equal to protection level associated with the verified anti-malware process 126.

As discussed above and in shown in FIG. 2, in order to have a protection level that is greater than a process signed by an anti-malware service 220, a process must be signed by one of: an operating system critical component 210 with a protection level of protected 204, and operating system critical component 216 with a protection level of protected light 206, an operating system component 212 with a protection level of protected 204, or an operating system component 218 with a protection level of protected light 206. Thus, even processes signed by an operating system manufacturer 304 may not have access to processes signed by the anti-malware services 220. Processes signed by an anti-malware service 220 may have access to processes signed by a different anti-malware service.

Figure 5:
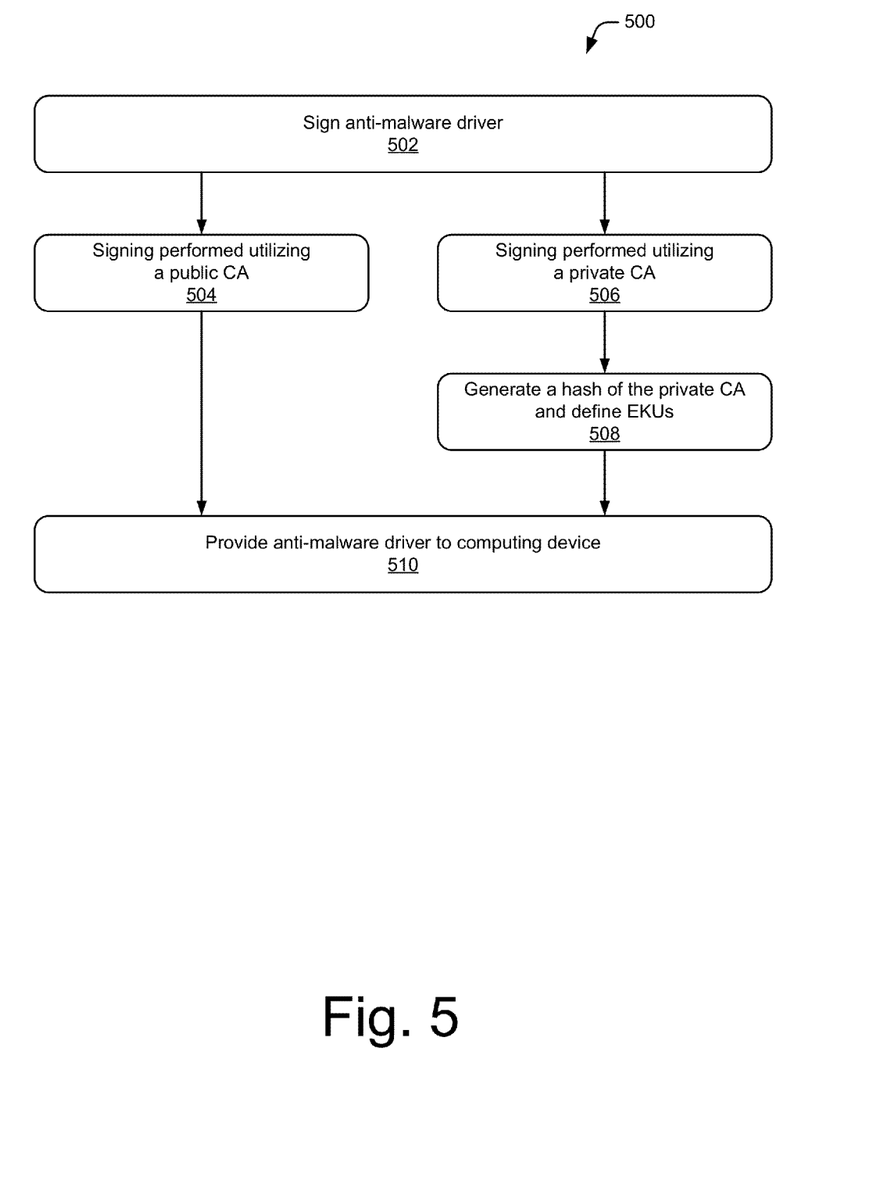
FIG. 5 depicts a procedure in an example implementation for signing an anti-malware driver.

FIG. 5 depicts a procedure 500 in an example implementation for signing the anti-malware driver 118 by an anti-malware manufacturer 302. The anti-malware manufacturer 302 signs the anti-malware driver 118 with the verified anti-malware signature 306 (block 502). This signing may be performed either utilizing a public CA or a private CA.

The anti-malware driver 118 is signed utilizing a public CA (block 504). For example, the anti-malware manufacturer 302 may utilize a CA such as VeriSign. As a result of this signing, the anti-malware manufacturer 302 could supply a hash of their software publisher certificate to aid in the protecting anti-malware process. When utilizing a public CA, the anti-malware manufacturer 302 is required to update the anti-malware driver 118 and anti-malware program each time a new agreement is reached with the operating system manufacturer 304. The new agreement may result in new certificates being issued for the anti-malware manufacturer 302.

The anti-malware driver 118 is signed utilizing a private CA (block 506). When utilizing a private CA, the anti-malware manufacturer 302 is not required to update the anti-malware driver 118 and anti-malware program each time a new agreement was reached with operating system manufacturer 302.

As a result of the signing in 506, the anti-malware manufacturer 302 could supply the hash of the CA certificate and one or more EKUs to the anti-malware driver 118 (block 508). The anti-malware service 308 provides the signed anti-malware driver 118 to the computing device 102 (block 510).

Figure 6:
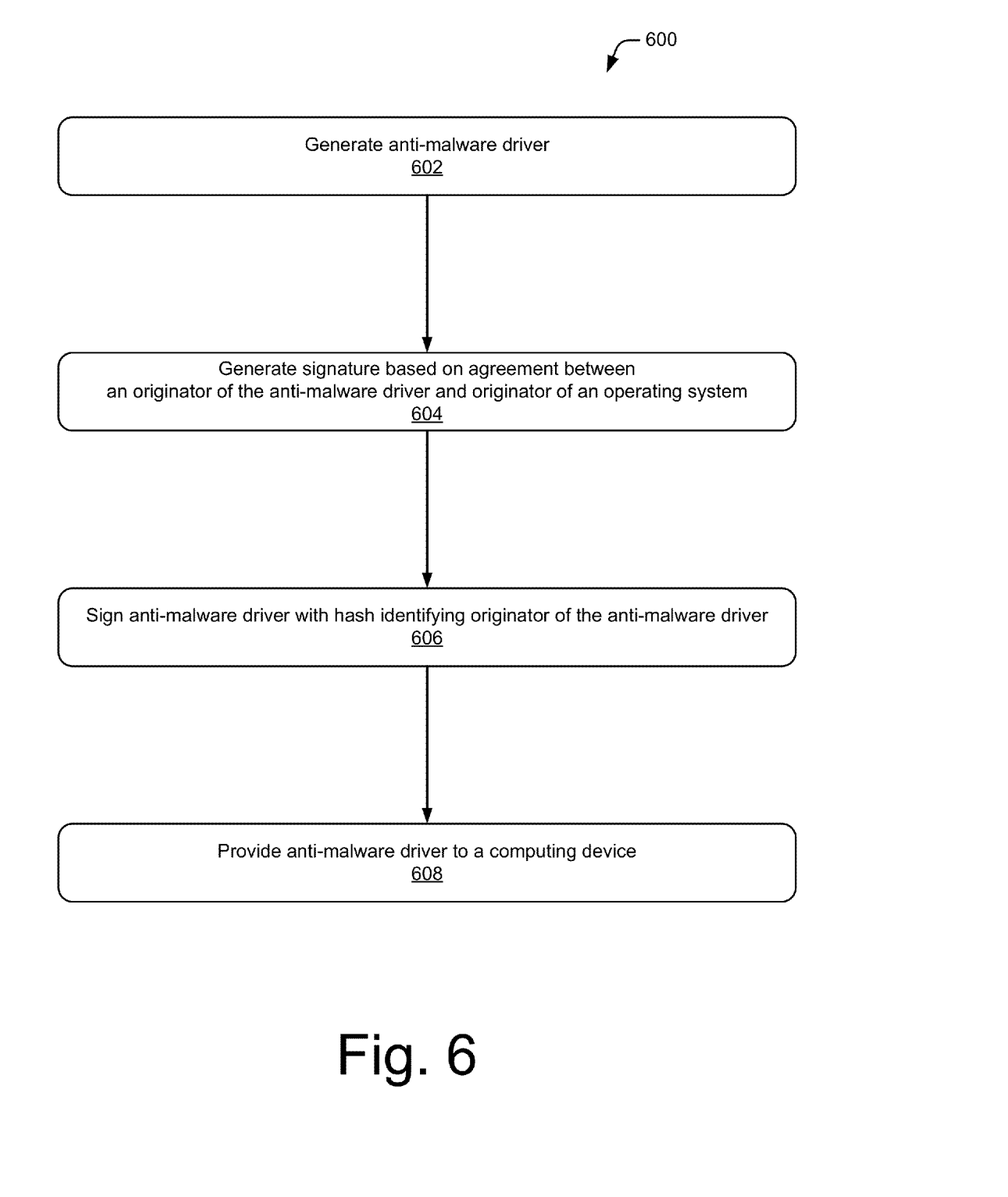
FIG. 6 depicts a procedure in an example implementation for providing an anti-malware driver to the computing device.

FIG. 6 a procedure 600 in an example implementation for providing an anti-malware driver to the computing device. An anti-malware driver 410 is generated for anti-malware service 308 (block 602). A signature is generated based at least in part on agreement between the anti-malware manufacturer 302 and the operating system manufacturer 304 (block 604). The anti-malware driver 118 is signed with the hash identifying the anti-malware manufacturer 302 (block 606). The anti-malware driver 118 is provided to computing device 102 (block 608).

Example System and Device

Figure 7:
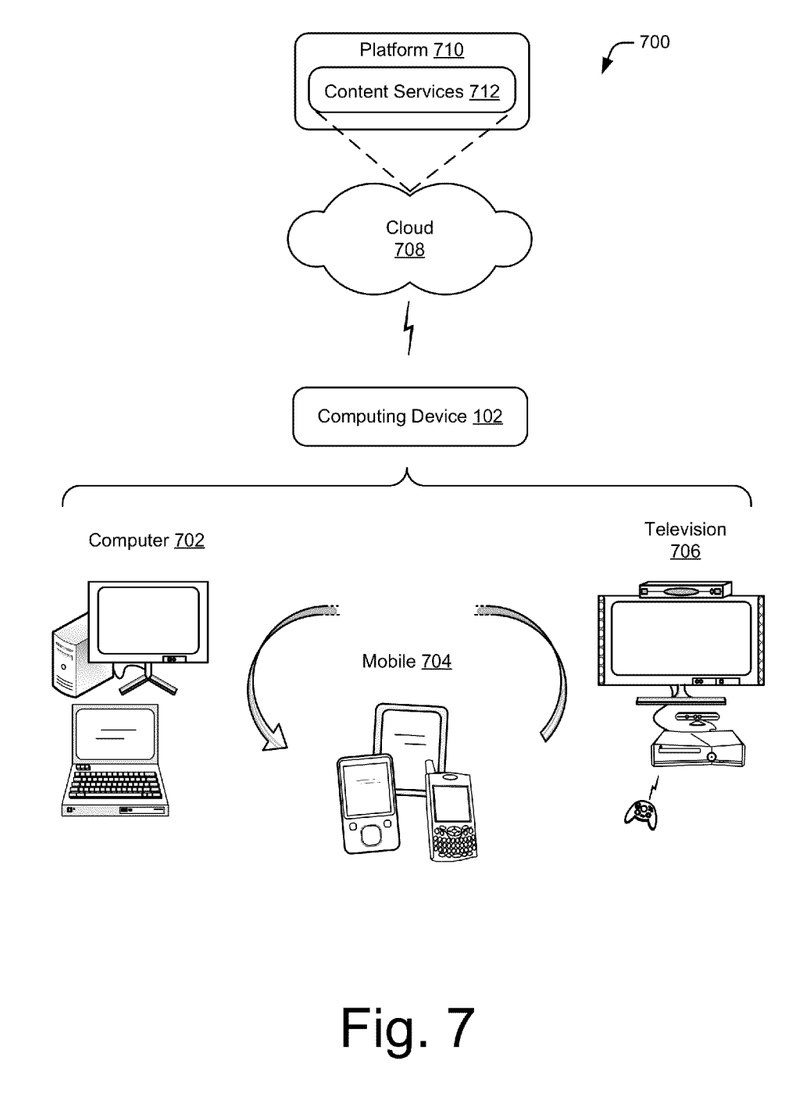
FIG. 7 illustrates an example system that includes the computing device as described with reference to FIG. 1.

FIG. 7 illustrates an example system 700 that includes the computing device 102 as described with reference to FIG. 1. The example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 702, mobile 704, and television 706 uses. Each of these configurations includes devices that may have generally different constructs and capabilities, and thus the computing device 102 may be configured according to one or more of the different device classes. For instance, the computing device 102 may be implemented as the computer 702 class of a device that includes a personal computer, desktop computer, a multi-screen computer, laptop computer, netbook, and so on.

The computing device 102 may also be implemented as the mobile 704 class of device that includes mobile devices, such as a mobile phone, portable music player, portable gaming device, a tablet computer, a multi-screen computer, and so on. The computing device 102 may also be implemented as the television 706 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 708 includes and/or is representative of a platform 710 for content services 712. The platform 710 abstracts underlying functionality of hardware (e.g., servers) and software resources of the cloud 708. The content services 712 may include applications and/or data that can be utilized while computer processing is executed on servers that are remote from the computing device 102. Content services 712 can be provided as a service over the Internet and/or through a subscriber network, such as a cellular or Wi-Fi network.

The platform 710 may abstract resources and functions to connect the computing device 102 with other computing devices. The platform 710 may also serve to abstract scaling of resources to provide a corresponding level of scale to encountered demand for the content services 712 that are implemented via the platform 710. Accordingly, in an interconnected device embodiment, implementation of functionality of the functionality described herein may be distributed throughout the system 700. For example, the functionality may be implemented in part on the computing device 102 as well as via the platform 710 that abstracts the functionality of the cloud 708.

Figure 8:
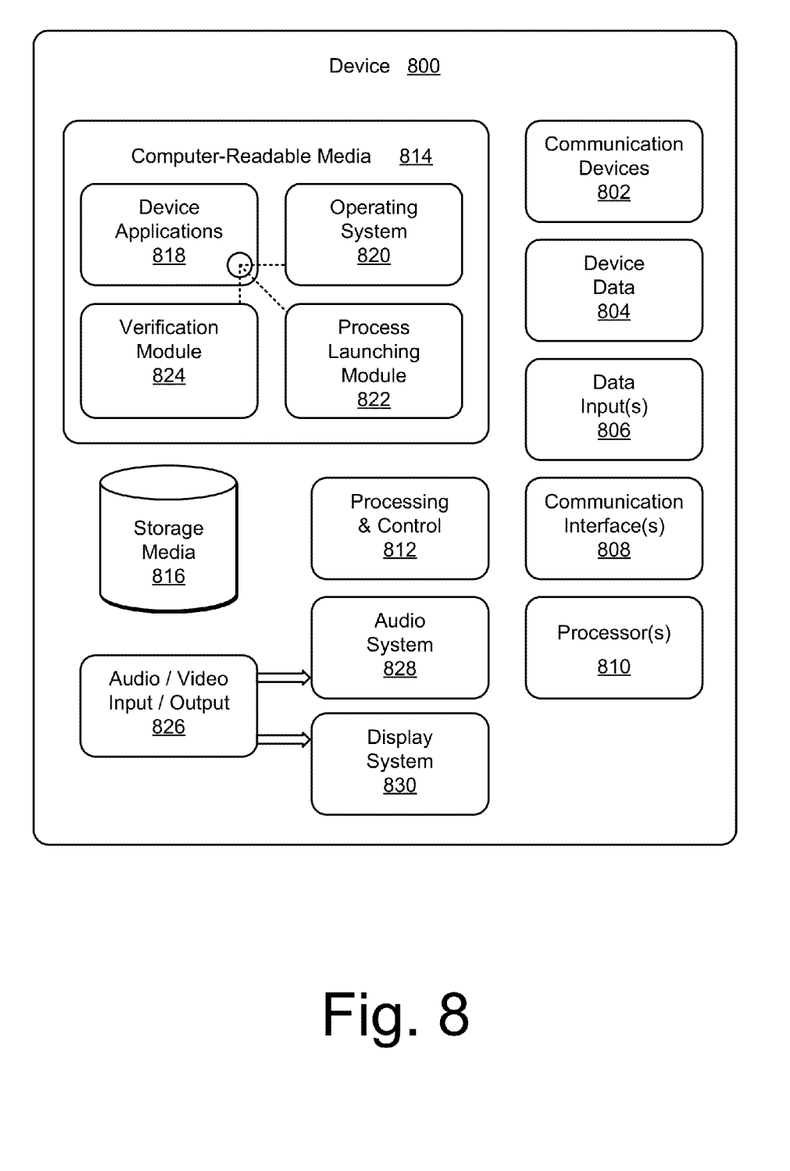
FIG. 8 illustrates various components of an example device that can be implemented as any type of computing device as described with reference to FIGS. 1-7 to implement embodiments of the techniques described herein

FIG. 8 illustrates various components of an example device 800 that can be implemented as any type of computing device as described with reference to FIGS. 1-8 to implement embodiments of the techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of the techniques described herein. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of the techniques described herein. In this example, the device applications 818 include a process launching module 822 and verification module 824 that are shown as software modules and/or computer applications. There may be additional software modules that are used to provide an interface with a device configured to capture inputs, such as a touchscreen, track pad, camera, microphone, and so on. Alternatively or in addition, the process launching module 822 and the verification module 824 can be implemented as hardware, software, firmware, or any combination thereof. Additionally, the additional software modules may be configured to support multiple input devices, such as separate devices to capture visual and audio inputs, respectively.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method comprising:
    signing an anti-malware driver by one or more computing devices with a signature verifiable to determine authenticity of the anti-malware driver through comparison of the signature to a verified signature from a trusted source to determine if the anti-malware driver originated from the trusted source;
    based on the verified signature, associating the anti-malware driver with at least one of a plurality of protection levels associated with anti-malware process protection techniques of the anti-malware driver, the plurality of protection levels defining which processes are permitted access to the anti-malware driver during execution by a computing device; and
    providing the anti-malware driver by the one or more computing devices to the computing device for execution.

2. The method of claim 1, wherein the providing includes supplying a hash that identifies a manufacturer of the anti-malware driver.

3. The method of claim 1, wherein the signing is performed utilizing a public certificate authority (CA).

4. The method of claim 1, wherein the signing is performed utilizing a private certificate authority (CA).

5. The method of claim 4, wherein the providing includes supplying a hash of the private certificate authority (CA) and a format of further definitions related to the private certificate authority (CA).

6. The method of claim 5, wherein the further definitions comprise one or more Extended Key Usages.

7. The method of claim 1, wherein the protection level associated with the anti-malware driver is selected from the plurality of protection levels arranged in a hierarchy.

8. The method of claim 7, wherein the protection level is granted based at least in part on an agreement between a manufacturer of the anti-malware driver and a manufacturer of an operating system.

9. The method of claim 1, wherein the anti-malware driver is platform independent.

10. A computing device comprising:
one or more processors;
one or more modules implemented at least partially in hardware and configured to cause the one or more processors to perform operations comprising:
signing an anti-malware driver with a signature verifiable to determine authenticity of the anti-malware driver through comparing the signature to a verified signature from a trusted source to determine if the anti-malware driver originated from the trusted source;
based on the verified signature, associating the anti-malware driver with at least one of a plurality of protection levels associated with anti-malware process protection techniques of the anti-malware drive, the plurality of protection levels defining which processes of a computing device are permitted to gain an invasive handle to a process executing the anti-malware driver; and providing the anti-malware driver to the computing device.

11. The computing device as described in claim 10, wherein said providing includes supplying a hash that identifies a manufacturer of the anti-malware driver.

12. The computing device as described in claim 10, wherein said signing is performed utilizing a public certificate authority (CA).

13. The computing device as described in claim 10, wherein said signing is performed utilizing a private certificate authority (CA).

14. The computing device as described in claim 13, wherein said providing includes supplying a hash of the private certificate authority (CA) and a format of further definitions related to the private certificate authority (CA).

15. The computing device as described in claim 14, wherein the further definitions comprise one or more Extended Key Usages.

16. The computing device as described in claim 10, wherein the protection level associated with the anti-malware driver is selected from the plurality of protection levels arranged in a hierarchy.

17. The computing device as described in claim 16, wherein the protection level is granted based at least in part on an agreement between a manufacturer of the anti-malware driver and manufacturer of an operating system.

18. The computing device as described in claim 10, wherein the anti-malware driver is platform independent.

19. One or more computer-readable storage media comprising instructions stored thereon that, responsive to execution by computing device, cause the computing device to perform operations comprising:
signing a platform independent anti-malware driver with a signature utilizing a hash that identifies a manufacturer of the anti-malware driver, the signature being verifiable to determine authenticity of the anti-malware driver by comparing the signature to a verified signature from the manufacturer to determine if the anti-malware driver originated from the manufacturer;
associating the anti-malware driver with a protection level based at least in part on an agreement between the manufacturer of the anti-malware driver and a manufacturer of an operating system, the associated protection level taken from a plurality of protection levels that define which processes are permitted access to the anti-malware driver during execution by a computing device; and
providing the anti-malware driver to the computing device.

20. One or more computer readable storage media as described in claim 19, wherein the hash comprises:
a public certificate authority (CA); or
a private certificate authority (CA) and a format of further definitions related to the private certificate authority (CA).

* * * * *